Figure 7:
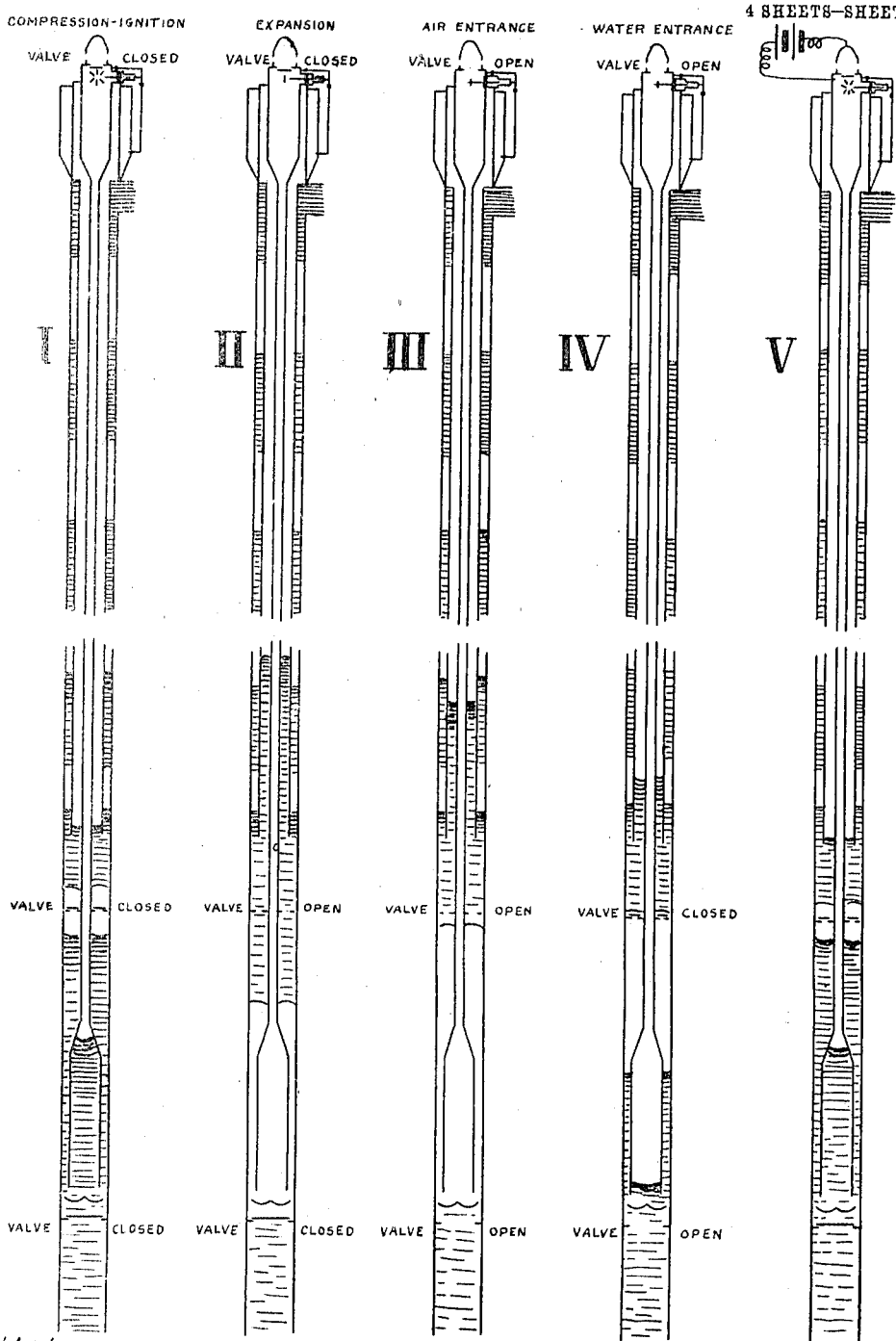

W. H. SMYTH.
APPARATUS FOR UTILIZING ENERGY DERIVED FROM EXPLOSIONS.
APPLICATION FILED OCT. 13, 1902.
1,064,179.
Patented June 10, 1913.
4 SHEETS—SHEET 1.
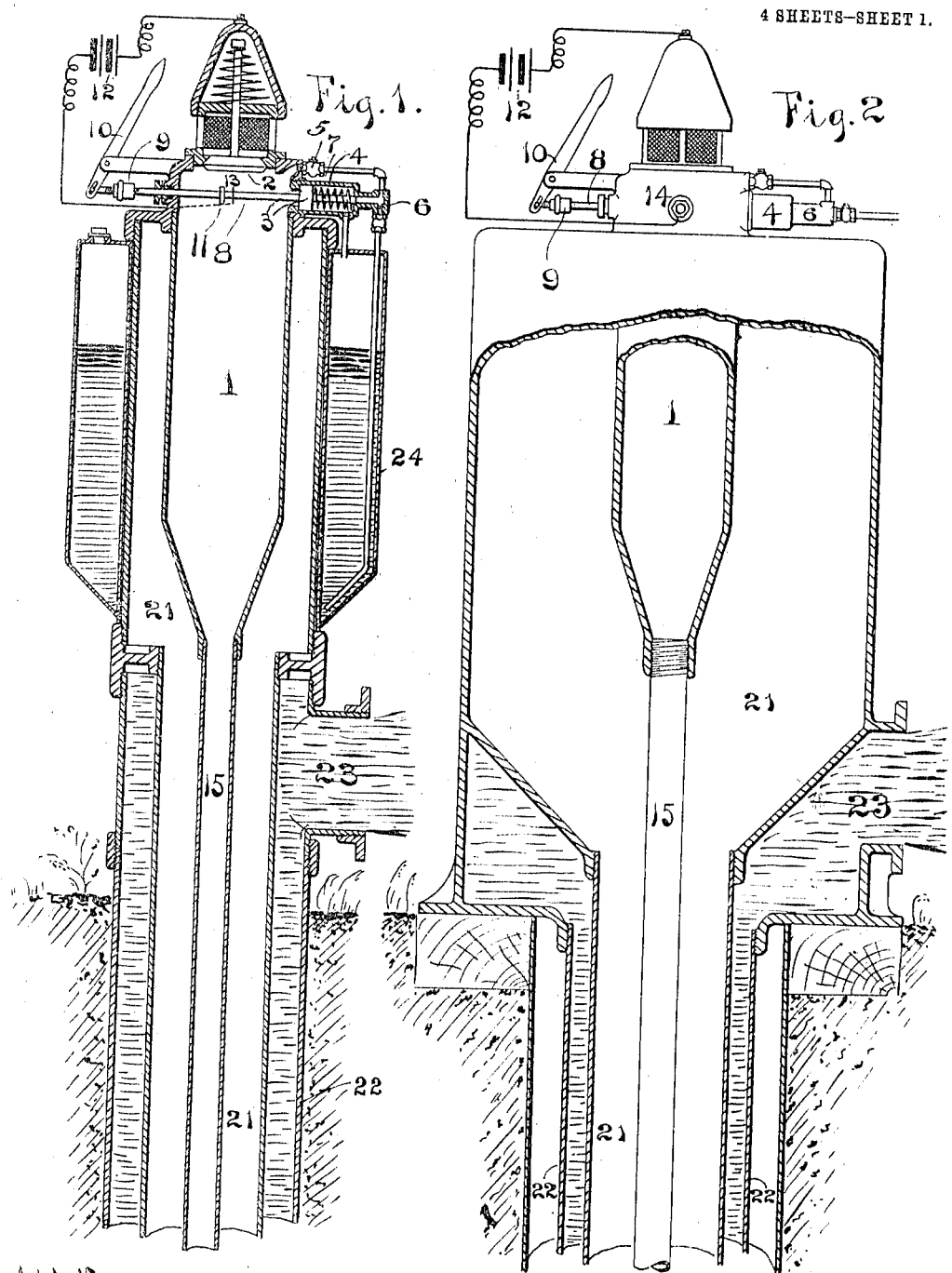

W. H. SMYTH.
APPARATUS FOR UTILIZING ENERGY DERIVED FROM EXPLOSIONS.
APPLICATION FILED OCT. 13, 1902.
1,064,179.
Patented June 10, 1913.
1 SHEETS—SHEET 2.
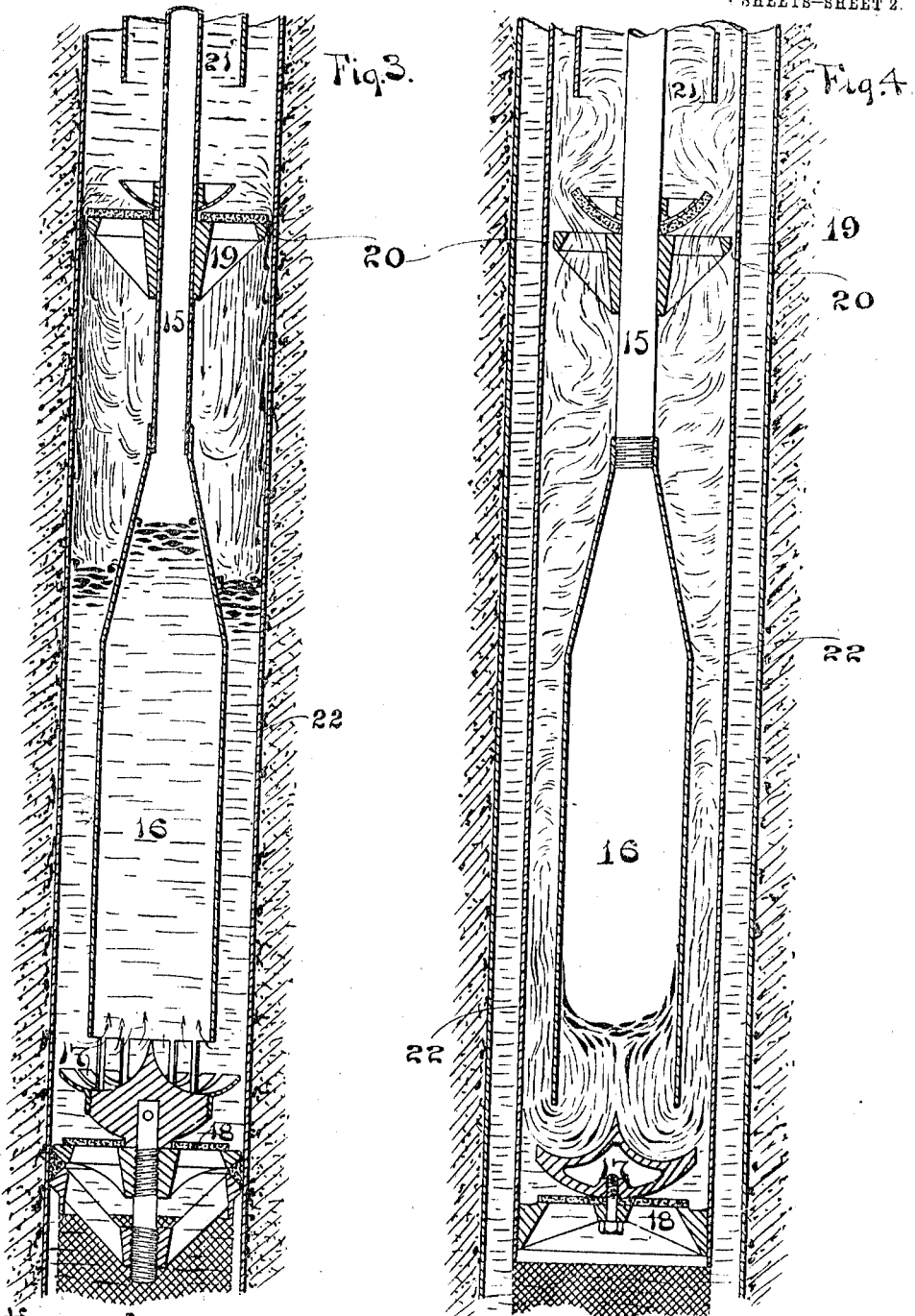

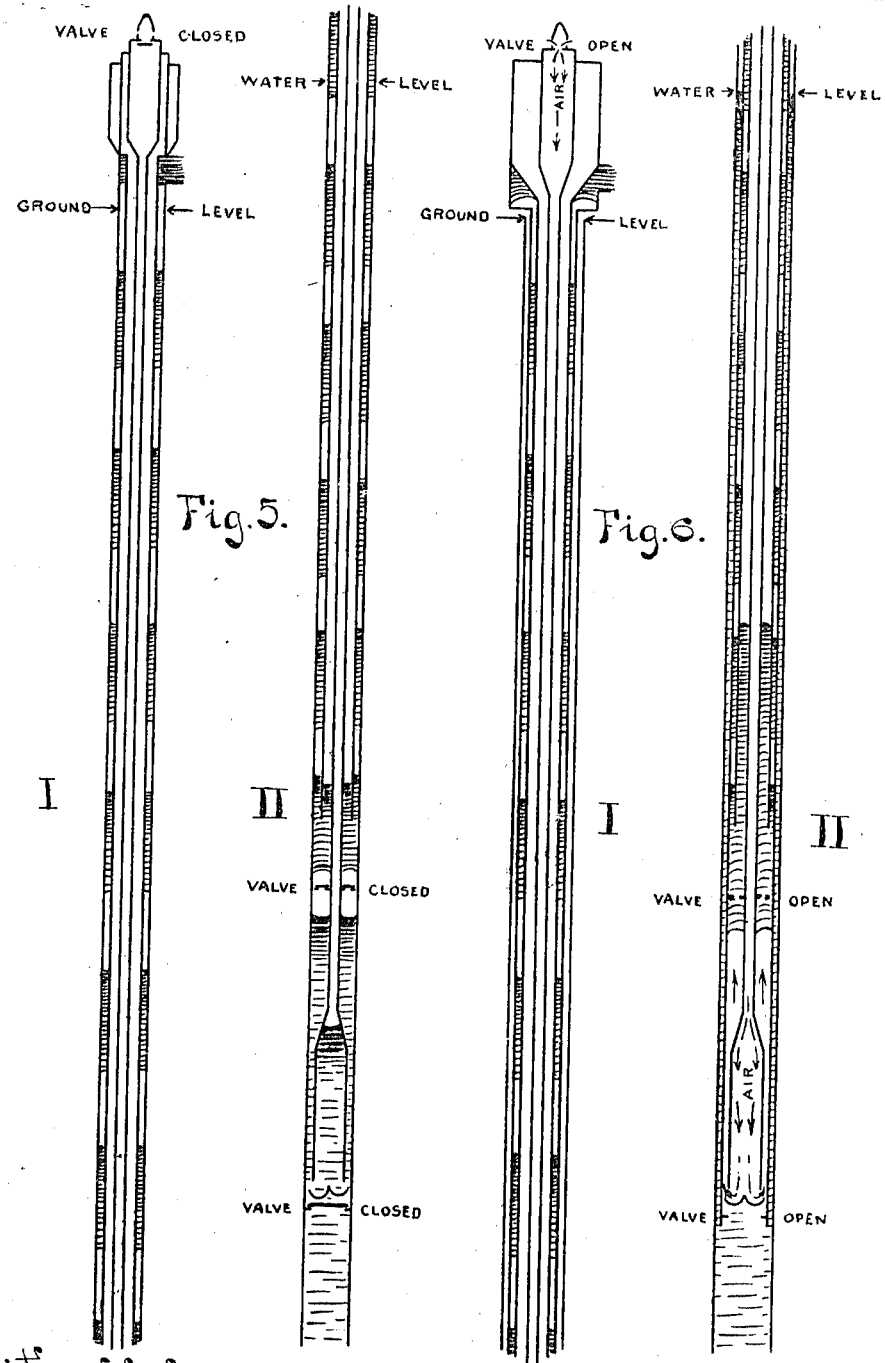

UNITED STATES PATENT OFFICE.

WILLIAM H. SMYTH, OF BERKELEY, CALIFORNIA, ASSIGNOR TO HUMPHREY GAS PUMP COMPANY, A CORPORATION OF NEW YORK.

APPARATUS FOR UTILIZING ENERGY DERIVED FROM EXPLOSIONS.

1,064,179.

Specification of Letters Patent.  Patented June 10, 1913.

Application filed October 13, 1902. Serial No. 127,173.

*To all whom it may concern:*

Be it known that I, WILLIAM H. SMYTH, citizen of the United States, residing at Berkeley, in the county of Alameda and State of California, have invented certain new and useful Improvements in Apparatus for Utilizing Energy Derived from Explosions; and I do hereby declare the following to be a full, clear, and exact description of the same.

This invention relates to improvements in means for raising or moving water. In addition to its application to moving water, it includes the utilizing of energy, derived from explosions generally.

The particular application used herein for the purposes of this disclosure is one expression; the compression of air is another, to which it is equally applicable. The generation of power for motive purposes generally, is still another expression of its utilization of heat energy.

It has been my object to make in the invention underlying the present disclosure available for all forms of pumping.

This invention is of so generic and pioneer a character and the conditions of its use are so diverse that many new arts and types of apparatus grow out thereof and constitute separate patentable subject matter. This is exemplified in certain copending applications to which reference is here made.

Applicant refers to his copending applications and patents as follows:—

Application filed Oct. 13, 1902, Serial No. 127,172 describes and claims the method, for effecting which, the apparatus and means of the present invention are adapted. Application filed Feb. 5, 1900, Serial No. 4127, describes and claims broadly his invention in the art of utilizing heat energy, by the expansion of combustible charges against liquid, moving a body of liquid by the action of said expansion, and compressing fresh expansible charges by energy derived from previous expansions. Application filed Feb. 5, 1900, Serial No. 4128 describes and claims apparatus and means for effecting the invention described in his application No. 4127. Application filed Feb. 5, 1900, Serial No. 4129 describes and claims special form of apparatus in the same art, in which for example, a combustion chamber is provided with an igniter, and means are provided to regulate the in and outflow of liquids, with an air chamber surrounding the combustion chamber, having an inlet passage thereto and a discharge from the air chamber. Application filed Aug. 4, 1903, Serial No. 168,233 describes a special form of apparatus in the same art in which there is provided, for example, a cylinder with an independent piston, a charge chamber attached to the cylinder provided with a pump suitably placed to engage the piston and to be operated thereby and introduce fuel into the cylinder, the cylinder and piston being suitably arranged to compress the charge by the momentum of the piston. Patent No. 936,677 dated Oct. 12, 1909 and Patent No. 950,082 dated Feb. 22nd, 1910, describe means relating to the same art.

This invention may be carried into effect by many forms of apparatus and may be employed under many different circumstances in which it is desired or necessary to raise or move water, compress air or furnish motive power.

One simple form of means for effecting this invention, and by which its objects may be accomplished is illustrated in the accompanying drawings, in which—

Figure 1 is a vertical section of the upper portion of one form of the apparatus. Fig. 2 is an elevation partly in section of a modification. Fig. 3 is a vertical section of the lower portion of the same apparatus to which Fig. 1 refers. Fig. 4 is a vertical section of the lower portion of the same apparatus to which Fig. 2 refers. Fig. 5 is a diagrammatic representation of the apparatus, illustrated in Figs. 1 and 3, in operation. The diagram being in two parts I and II which are longitudinal continuations of each other placed side by side for convenience of illustration. Fig. 6 is a similar diagram referring to the apparatus illustrated in Figs. 2 and 4, the parts of which are marked I and II. Fig. 7 is a series of diagrams showing the cycle of operations or steps in the process as carried into effect in the apparatus shown on Figs. 1, 2, 3 and 4.

Referring to the drawings, 1 is an explosion chamber provided at its upper end with an air inlet valve 2. Any suitable means for supplying fuel may be provided. One such is shown in the present illustration as consisting of a piston 3 in a cylinder 4 open inwardly to the explosion chamber and a spring 5 resting against the piston. This piston 3 operates the plunger pump 6, which has pipe connections to a suitable source of fuel, through check valve 7 and also to the explosion chamber. The plunger if this pump is shown as a piston rod attached to piston 3. A device to limit the motion of piston 3 is provided, which is illustrated herein as a rod 8 attached to piston 3 and extending to the exterior of the explosion chamber where it is supplied with a threaded stop 9 and operating handle 10.

An igniting device of any suitable character is provided. One such is illustrated in Fig. 1, in which a tappet or projection extending laterally from the side of rod 8, as shown at 11, forms a wiper and one of the electrodes of a suitable electric battery 12. The other electrode 13 consists of an ordinary flat spring in the path of movement of the wiper 11, see Fig. 1, and is attached to a suitably insulated plug 14 which passes to the outside of the explosion chamber 1, see Fig. 2.

Extending downwardly from and as a continuation of the explosion chamber 1 is a pipe 15 of a length to suit the requirements of the situation or condition under which the device is to operate. The lower end of this pipe is preferably enlarged to form an expansion chamber 16 and it is open at the bottom to permit outflow therefrom. Adjacent to the lower end of 16 is a deflector 17 shown in the present instance as a concave ring or annulus. Below this deflector is provided a suitable valve 18. A short distance from the expansion chamber 16 is provided an outwardly opening valve 19. For reasons which will hereinafter be described, this valve 19 is arranged to act only as a partial or temporary check leaving the discharge passage of the liquid always, at least partly, open for the return of the liquid. This opening may vary as to size. An air chamber 21, preferably formed around the pipe 15 and the explosion chamber 1, is provided. It is shown in the present instance as a pipe extending from near the top of the explosion chamber down to a short distance above the valve 19, and being open at its lower extremity. Surrounding the expansion chamber is the pipe 22, which in this form may serve also as a well casing as shown in Figs. 1 and 3. An outlet 23 of any suitable character is provided in this pipe. In Fig. 1, I have also shown a liquid fuel tank 24, which for convenience is made of annular shape and rests upon and around the upper portion of air chamber 21.

As will be seen from the drawings, in the forms illustrated, the pipe 22 is in effect a discharge pipe for the whole of its length, that is from the inlet valve 18 to the discharge aperture 23. It however at times during the operation, performs other functions than merely acting as a discharge conduit. The lower part for example and for an indefinite distance upward from the inlet valve 18, performs the function with chamber 16 of an expansion chamber. It also performs the functions of an inlet pipe. These various capacities of the pipe make it difficult to separate the inlet pipe, the expansion chamber and the discharge pipe as in the present form, the functions of these various devices happen to be all performed by pipe 22. It is not however necessary that these various functions should be performed by the same pipe. It is thus more convenient for the purpose of the description to consider the pipe 22 from end to end and so describe it as a discharge pipe, than to designate various undefined portions by names indicating functions which during the operation these parts perform, in addition to the general function of being a discharge conduit for the water which passes into the structure.

The preceding description refers particularly to Figs. 1 and 3 though it is applicable also to Figs. 2 and 4 with the exception that in the latter case, the outer pipe 22 is independent of the well casing and is an integral part of the apparatus and removable from the well therewith. In this latter form no special fuel supply is shown as this is intended to be located at any suitable or convenient place.

The cycle of operation and the steps of the process as exemplified in the apparatus, are illustrated in the diagrammatic series Fig. 7, in which, for simplicity and clearness, the details of mechanical construction have been omitted. I, shows the charge in the explosion chamber under compression and just sparked. It also shows the volume of air trapped in the casing rising with the column. II shows the expansion of the charge and the displacement of the water in the expansion chamber and casing thereto. It further shows the compression of air by the entrance of the water piston into the air chamber. III shows the condition of partial vacuum existing in the explosion and expansion spaces and the consequent entrance of atmospheric air into the explosion and expansion spaces filling them with air at atmospheric pressure having in its passage scavenged the spent gas from the explosion space. This diagram also shows the highly compressed air in the air chamber discharging some of the water into the discharge column. It also shows the water entrance valve open, permitting the entrance of fresh water. IV shows water having entered and trapped a volume of air in the casing and commencing to rise in the expansion chamber. V shows the return of the water due to the pressure of the head or the resilience of the cushion; closing of the suction valve; the compression of the charge in the explosion chamber. In fact this diagram shows the end of the cycle of operation as Diagram I shows the beginning and they are consequently alike.

Under the conditions indicated in the drawings, the operation of the apparatus will be as follows:—The explosion chamber 1 being supplied with air at a pressure above atmosphere caused in a manner hereinafter described, fuel is introduced into it by the pump 6 operated by the compressed air acting upon piston 3. A spark is caused by the contact breaking of the sparking devices 11 and 13 and the explosive mixture formed of the air and the fuel being thereby inflamed will generate heat within the explosion chamber 1 and cause a great expansion of the gases therein contained. The charge expands in the explosion chamber and expansion chamber 16 and thus displaces the contained water driving it out thereof into the discharge casing and air chamber 21. Continued expansion of the gases forces the water so that it compresses the contained air which is already compressed to or above the pressure of the head. The return or rebound of the water is retarded or controlled by the valve 19. The gases in the explosion chamber 1 and expansion chamber 16 having parted with energy in performing the work of forcing the water into the air chamber 21 are now unable to sustain the atmosphere pressing upon the outside of the valve 2 at the top of the explosion chamber. Atmospheric pressure consequently forces the valve 2 open and air enters the explosion and expansion spaces carrying the spent gases forward and filling these spaces with spent gas and air to a pressure practically that of atmosphere. Thus the spent gas is scavenged from and the explosion space is filled with pure air. The expansion chamber 16 being in the present form below the normal supply water level, water flows through the valve 18 and compresses the air in the expansion chamber 16 and in the casing 22 below the valve 19 to a degree commensurate with the gravity of the water. At the same time the incoming water separates the contained air in the expansion chamber 16 from that in the casing 22 and traps in the latter a volume of air. The valve 19 being, as stated, an imperfect check or temporary restraint only, permits the back flow or rebound of the water due to the head and the resilience of the cushion. This compresses the air in the expansion and explosion spaces. The air trapped in the casing meanwhile passes upward into the column. Of course during these described steps the augmented pressure in the air chamber 21 due to the explosive energy, is asserting itself to drive out the water into the discharge casing 22 and to its exit 23 above the surface. The recompression of the air in the explosion chamber 1 is the condition started with, so it again operates the fuel supply and sparker devices and thus repeats indefinitely the cycle of operations. At each operation, a volume of water and a volume of air are forced into the discharge column. Each volume of air diminishes the specific gravity of the combined column of air and water constituting the discharge stream, shown by shaded and blank parts in Figs. 5 and 6. Not only does the discharge column diminish in specific gravity but it is transformed from a solid incompressible inert column into a resilient cushion readily compressible by a sudden and energetic blow. In other words the discharge column is transformed from a solid incompressible mass of great specific gravity into a sensitive continually renewing spring of less specific gravity peculiarly adapted to receive and store up in itself the energy generated in the explosion chamber and return it in the form of useful work.

It is obvious of course that in starting up the first time there is no head due to an outflowing stream, nevertheless there is some compression both in the air chamber and in the explosion chamber due to submergence. This performs the same function of prior compression of charge that the head performs to an added degree, in fact it is head, so far as this function is concerned. As the water rises in the discharge column, so the prior compression increases in like ratio, therefore in starting up for the first time, all that is necessary is to introduce and ignite a charge by means of the handle 10 or prime the discharge pipe with water.

The diagrams Figs. 5 and 6 are intended to illustrate the condition or resilient character of the discharge stream and also the fact that as the entrapped and compressed air rises toward the surface, it gradually expands with a consequent acceleration of the speed of the discharge water. This latter fact is illustrated by the increased space occupied by air as compared with the uniform space occupied by water from the bottom of the column to the top Diagram, Fig. 5 also illustrates the location of the discharge stream as being between the air chamber and the well casing.

Diagram, Fig. 5 further represents that stage in the process which this apparatus carries into effect in which the compressed gases are ready to be ignited and the trapped volume of air is just ascending into the discharge column by reason of its buoyancy.

Diagram, Fig. 6 shows the resilient discharge column located between the air chamber and an outer pipe integral with the pump and independent of the well casing.

Diagram, Fig. 6 also shows a water level in the well. This level is the same in Fig. 5 though owing to the form of the apparatus it is not perceivable except in its effect.

Diagram, Fig. 6 further illustrates that stage in the process at which the complete expansion has taken place and the air inlet valve is open so that the atmospheric pressure is supplementing the waning pressure due to explosive energy resulting in greater travel of the water pistons.

It has been stated in the foregoing description that the explosion chamber 1 and pipe 15 are preferably located within the air chamber and that the air chamber extends downward to near the bottom of the well. In the first place the explosion chamber is surrounded by an efficient non-conductor which conserves the heat and consequent energy of the inflaming gases and further this non-conductor is not of merely passive character such as is placed for example around steam pipes but is of such a character in its present association that whatever heat is conveyed through the walls of the explosion chamber and conducting pipe is taken up and utilized by the air in the air chamber and transformed into useful work in the form of pressure upon the ascending column of water. This arrangement thus gives ideal conditions for the utilization of the heat energy generated within the explosion chamber.

This invention also presents ideal conditions for the utilization of energy in that it provides for the following requirements for the economical utilization of energy as displayed in explosive action:—High initial cylinder temperature and pressure; low terminal cylinder temperature and pressure; expansion to below atmospheric pressure; neutralizing unbalanced atmospheric pressure by atmospheric balancing; conditions to prevent heat dispersion except in effective work; utilizing heat radiated from or conducted through the walls of an explosion chamber in effective work; compression of charge prior to ignition; prior compression of charge in proportion to or greater than the resistance to be met by the expansion of the inflaming charge; compression automatically produced, regulated and controlled by the resistance to be overcome; diminishing the specific gravity of a water column; transforming a column of water into a resilient cushion; initial piston speed unlimited and comparable to the unrestrained speed of expansion of inflaming gas; immediate conversion and storing of energy due to inflaming; expansion commensurate with varying initial temperatures; a piston of extreme mobility and sensitively responsive to initial pressure of an inflaming charge; transmitting association between a piston and power utilizing means in which the resistance to be overcome is applied with increasing instead of diminishing intensity commencing at nil; diluting the products of combustion with a large volume of air; complete scavenging of spent or used gases.

As therefore this disclosure introduces in useful expression such broadly novel principles, functions and effects for the utilization of the energy of explosive action and their application to raising and moving of water, it is not desired that the invention be limited to the forms, proportions or arrangements of the parts herein illustrated or any particular mechanical expression thereof, but I desire to claim the invention or inventions herein in the broadest manner as a pioneer invention.

What I claim is:—

1. In an apparatus for raising or propelling liquid, with means for applying energy derived from explosions to the forcing of a column of liquid in advance of the explosive charges, the combination of an explosion chamber, automatic means for forming an explosive mixture within the explosion chamber, means to permit the direct return of a portion of said liquid which remains in the column after each explosion, and means for introducing into said column an elastic fluid.

2. In an apparatus for raising or propelling liquid, with means for applying energy derived from explosions to the forcing of a column of liquid in advance of the explosive charges, the combination of an explosion chamber, automatic means for forming an explosive mixture within the explosion chamber, means to permit the direct return of a portion of said liquid which remains in the column after each explosion, and means for introducing into said column an elastic fluid of less specific gravity.

3. In an apparatus for applying energy derived from explosions, the combination with an explosion chamber of means for automatically forming and admitting an explosive charge thereinto, means for igniting said charge, means for admitting a body of liquid into a confined space in free communication with said chamber so that it shall be in contact with the products of combustion of said charge when explosion occurs, means for permitting the escape of said liquid from said space under the expansive force of the explosion and against the resistance to be overcome and permitting the direct return of a portion of it thereto, and means for commingling air or other gas with said body of liquid upon the discharge side of said chamber whereby it is rendered elastic.

4. In an apparatus for applying energy derived from explosions, the combination with an explosion chamber of automatic means for admitting air into said chamber upon reduction of pressure therein and preventing escape of air and other gas therefrom upon increase of pressure, means for admitting explosive fuel into said chamber, means for igniting said fuel, means for admitting liquid under pressure greater than atmospheric into a confined space in free communication with said chamber, whereby the air therein is compressed, and means for permitting the escape of said liquid under the expansive force of the explosion and against the resistance to be overcome and the direct return of a portion of said liquid thereto.

5. In an apparatus for applying energy derived from explosions, the combination with an explosion chamber of means for automatically forming an explosive charge within the explosion chamber, means for igniting said charge, means for admitting a body of material that is capable of flowing into a confined space in free communication with said chamber, means for permitting and directing the escape of said material in a discharge column under the expansive force of the explosion and the direct return of a portion of it to said space, and a resilient cushion in communication with said column.

6. In an apparatus for applying energy derived from explosions, the combination with an explosion chamber of means for automatically forming an explosive charge therein, means for igniting said charge, means for admitting a body of material that is capable of flowing into a confined space in free communication with said chamber, means for permitting and directing the escape of said material in a discharge column under the expansive force of the explosion and the return of a portion of it to said space and a resilient cushion in communication with said column, and means for introducing into said column an elastic material of less specific gravity.

7. In an apparatus for raising or propelling liquid, the combination with means for applying energy derived from explosions to the forcing of a column of liquid in advance of the explosive charges, means for introducing into said column an elastic fluid of less specific gravity and means for permitting backward flow of a portion of the actuated liquid whereby a subsequent charge is compressed prior to ignition.

8. In an apparatus for raising and propelling liquid, the combination with means for applying energy derived from explosions to the forcing of a column of liquid in advance of the explosive charges of fuel introducing means, means to introduce air by atmospheric pressure and to separate a portion thereof to form with the fuel an explosive charge, means for introducing into said column an elastic fluid of less specific gravity, and an air chamber or other resilient cushion adapted to receive the impact of the liquid actuated by the exploding charge, the cushion being in free communication with the liquid to be raised.

9. In an apparatus for raising or propelling liquid, the combination with means for applying energy derived from explosions to the forcing of a column of liquid in advance of the explosive charges, means for introducing into said column an elastic fluid of less specific gravity, means for permitting the direct backward flow of the liquid whereby a subsequent charge is compressed prior to ignition and an air chamber or other resilient cushion adapted to receive the impact of the liquid actuated by the exploding charge, the cushion being in free communication with the liquid to be raised.

10. In an apparatus for applying energy derived from explosions, the combination with a combustion and expansion chamber of automatic means for admitting air into said chamber upon reduction of pressure therein and preventing escape of air and other gases therefrom upon increase of pressure, means for admitting fuel separately into said chamber, means for igniting said fuel, means for admitting liquid into a confined space in free communication with said chamber, whereby the air therein is compressed, and means for permitting the escape of said liquid under the expansive force of the explosion and against the resistance to be overcome.

11. In an apparatus for applying energy derived from explosions, the combination with a combustion and expansion chamber, means for admitting explosive fuel into said chamber, means for igniting said fuel, a freely movable body of material acting as a piston introduced between the explosive fuel and the resistance to be overcome by the expansion of the fuel, automatic means for introducing atmospheric pressure on the same side of the movable body as the pressure of the expanding charge and during its expansion whereby atmospheric pressure supplements the pressure of the expanding gases.

12. In an apparatus for applying energy derived from explosions, the combination with a combustion and expansion chamber, means for admitting explosive fuel into said chamber, means for igniting said fuel, a freely movable body of material acting as a piston introduced between the explosive fuel and the resistance to be overcome by the expansion of the fuel, and an air chamber or other resilient cushion adapted to receive the impact of the piston, automatic means for introducing atmospheric pressure on the same side of the piston as the pressure of the expanding charge and during its expansion whereby atmospheric pressure supplements the pressure of the expanding gases.

13. In an apparatus for applying energy derived from explosions, the combination with a combustion and expansion chamber, means for admitting an explosive charge into said chamber, means for igniting the charge, an elastic cushion, a liquid introduced between the explosive fuel and the elastic cushion suitably arranged to compress the charge by the resilience of the elastic cushion and means adapted to admit atmospheric pressure to the explosive charge during its expansion.

14. In an apparatus for raising or propelling liquid, the combination with a combustion and expansion chamber, of means for admitting water, means for admitting an explosive charge whereby the water to be raised is supported by said charge prior to ignition, means adapted to ignite the charge, means adapted to admit atmospheric pressure to the expanding gases and means adapted to introduce air or other gas into the water to be raised.

15. In an apparatus for raising or propelling liquid, the combination of a combustion and expansion chamber, of means for admitting water, means for admitting an explosive charge whereby the water to be raised is supported by said charge prior to ignition, means adapted to ignite the charge, means adapted to admit atmospheric pressure to the expanding gases, means adapted to introduce air or other gas into the water to be raised and an air chamber or other elastic cushion adapted to receive the impact of the expanding charge, the cushion being in free communication with the water to be raised.

16. In an apparatus for applying energy derived from explosions, the combination with a combustion and expansion chamber, means for admitting explosive fuel into said chamber, means for igniting said fuel, a freely movable body of material acting as a piston introduced between the explosive fuel and the resistance to be overcome, means adapted to admit atmospheric air and pressure on the same side of the piston as the pressure of the expanding charge and during its expansion and means adapted to separate a portion of the admitted air to form a subsequent charge.

17. An apparatus comprising a charge and expansion chamber, means for admitting a gaseous charge into said chamber, means adapted to effect the expansion of said charge, an air chamber or other resilient cushion, a freely movable body of material acting as a piston introduced between the explosive charge and the resilient cushion, means adapted to admit atmospheric air and pressure to the expansion space during expansion and means adapted to separate a portion of the admitted air to form a subsequent charge.

18. An apparatus of the named type comprising a charge and expansion chamber, means for admitting a gaseous charge into said chamber, means adapted to effect the expansion of said charge, liquid acting as a piston introduced between the gaseous charge and the resistance to be overcome by the expansion of the charge, means adapted to admit atmospheric air and pressure to the expansion space during expansion and means adapted to separate a portion of the admitted air to form a subsequent charge.

19. An apparatus of the named type comprising a charge and expansion chamber, means for admitting a gaseous charge into said chamber, means adapted to effect the expansion of said charge, an air chamber or other resilient cushion, liquid acting as a piston introduced between the gaseous charge and the resilient cushion, means for directing the liquid against the resilient cushion, means adapted to admit atmospheric air and pressure to the expansion space during expansion and means adapted to separate a portion of the admitted air to form a subsequent charge.

20. In an apparatus for applying energy derived from explosions, the combination with a combustion and expansion chamber, of means for admitting a succession of explosive charges, means for igniting said charges, means for admitting a body of liquid into said chamber, means for permitting the escape of said liquid from said chamber under the expansive force of the explosions and against the resistance to be overcome, means for commingling air or other gas with said body of liquid upon the discharge side of said chamber whereby it is rendered elastic and means for directing and permitting the escaping liquid free communication backward toward the explosion chamber whereby the succeeding charge is compressed prior to ignition.

21. An apparatus of the named type comprising a charge and expansion chamber, means for admitting a gaseous charge into said chamber, means for admitting a liquid, a resilient cushion interposed between the charge and the liquid to be moved, means adapted to effect the expansion of the charge against the liquid and consequently its motion against the resilient cushion, means adapted to admit atmospheric air and pressure to the expansion space during expansion, and means adapted to separate a portion of the admitted air to form a subsequent charge.

22. An apparatus of the named type comprising a charge and expansion chamber, means for admitting a gaseous charge into the chamber, means for admitting liquid, means adapted to effect the expansion of said charge, against liquid to be raised, adapted to admit atmospheric air and pressure to the expansion space during expansion, and means adapted to separate a portion of the admitting air to form a subsequent charge.

23. An apparatus of the named type comprising a charge and expansion chamber, means for admitting a gaseous charge into said chamber, means for admitting liquid, means adapted to effect the expansion of the charge whereby the movement of the liquid is effected against a resilient cushion, means adapted to admit atmospheric air and pressure to the expansion space during expansion, and means adapted to separate a portion of the admitted air to form a subsequent charge.

24. An apparatus of the named type comprising a charge and expansion chamber, means for admitting a gaseous charge into said chamber, means for admitting liquid to be raised, means adapted to effect the expansion of the charge whereby the movement of the liquid is effected, means adapted to admit atmospheric air and pressure to the expansion space during expansion, means adapted to separate a portion of the admitted air to form a subsequent charge, and means adapted to introduce the remaining portion of the air into the liquid to be raised.

25. An apparatus of the named type comprising a charge and expansion chamber, means for admitting a gaseous charge into said chamber, means for admitting liquid to be raised, a resilient cushion, means adapted to effect the expansion of the charge against liquid and consequently the motion of the latter against the resilient cushion, means adapted to admit atmospheric air and pressure to the expansion space during expansion, means adapted to separate a portion of the admitted air to form a subsequent charge, and means adapted to introduce the remaining portion of the air into the liquid to be raised.

26. An apparatus of the named type comprising a charge and expansion chamber, means for admitting a gaseous charge into said chamber, means for admitting liquid to be raised, means adapted to effect the expansion of said charge against the liquid, means adapted to admit atmospheric air and pressure to the expansion space during expansion, means adapted to separate a portion of the admitted air to form a subsequent charge, and means adapted to introduce the remaining portion of the air into the liquid to be raised.

27. An apparatus of the named type comprising a charge and expansion chamber, means for admitting a gaseous charge into said chamber, means for admitting liquid to be raised, a resilient cushion, means adapted to effect the expansion of the charge whereby the movement of the liquid is effected against the resilient cushion, and means adapted to admit atmospheric air and pressure to the expansion space during expansion, means adapted to separate a portion of the admitted air to form a subsequent charge, and means adapted to introduce the remaining portion of the air into the liquid to be raised.

28. In an apparatus for applying energy derived from explosions, the combination with a combustion and expansion chamber, of means for admitting an explosive charge thereinto, means for igniting said charge, means for admitting a body of material that is capable of flowing into a confined space in free communication with said chamber, means for permitting and directing the escape of said material in a discharge column under the expansive force of the explosion and for permitting the direct return of a portion of it to said space and means for separating a portion of the liquid from the column to constitute a free piston for a subsequent operation of the device.

29. In an apparatus for applying energy derived from explosions, the combination with a combustion and expansion chamber, of means for admitting an explosive charge thereinto, means for igniting said charge, means for admitting a body of material that is capable of flowing into a confined space in free communication with said chamber, means for permitting and directing the escape of said material in a discharge column under the expansive force of the explosion and for permitting the direct return of a portion of it to said space and means adapted to separate a portion of the liquid from the column by interposing a body of air.

30. In an apparatus for applying energy derived from explosions, the combination of a combustion and expansion chamber, means for admitting an explosive charge thereinto, means for igniting said charge, means for admitting a body of liquid in free communication with said chamber, means for permitting and directing the escape of said liquid in a discharge column under the expansive force of explosion and for permitting the direct return of a portion of it toward said space and means adapted to separate a portion of the liquid from the column by interposing a body of air and a resilient cushion in communication with said column.

31. In an apparatus for applying energy derived from explosions, the combination of a combustion and expansion chamber, means for admitting an explosive charge, means for igniting said charge, means for admitting a body of material in communication with said chamber, means for directing said material into a receiver under the expansive force of the explosion and permitting the direct return of a portion of the material to said chamber and means for introducing a second charge before its return.

32. In an apparatus for raising or moving water, the combination of a chamber, means adapted to introduce a volume of air thereinto, means adapted to introduce water in contact with said air whereby it is supported thereon, means adapted to separate a portion of the air and means adapted to expand the separated portion by heat whereby its expansion and the compression of the remaining portion of air is effected against a column of water.

33. In an apparatus for applying energy derived from explosions, the combination of a combustion and expansion chamber, means for admitting an explosive charge thereinto, means for igniting said charge, means for admitting a body of material in communication with said chamber, means for permitting and directing the escape of said material into a discharge column under the expansive force of the explosion and permitting the direct return of a portion of the material to said chamber and means for introducing a second charge before its return.

34. In an apparatus for applying energy derived from explosions, the combination of a combustion and expansion chamber, means for admitting an explosive charge thereinto, means for igniting said charge, means for admitting a body of material in communication with said charge, means for directing said material into a discharge column under the expansive force of the explosion and permitting the direct return of a portion of the material to said chamber and means for introducing a second charge before its return and means for introducing into said column an elastic material of less specific gravity.

35. An apparatus for raising water comprising a combustion and expansion chamber having an igniter, means adapted to introduce an explosive charge thereinto, means for admitting water to be raised, a valve opening freely inward for the admission of air into the combustion chamber and a discharge pipe.

36. An apparatus for raising water comprising a combustion and expansion chamber having an igniter, means adapted to introduce an explosive charge thereinto, means for admitting water to be raised, a valve opening freely inward for the admission of air into the combustion chamber, a discharge pipe and means to introduce air into the water to be raised.

37. An apparatus for raising water comprising a combustion and expansion chamber having an igniter, means adapted to introduce an explosive charge thereinto, means for admitting water to be raised, a valve opening freely inward for the admission of air into the combustion chamber, an air chamber or other resilient cushion adapted to oppose the expansion of the charge, and a discharge pipe.

38. An apparatus for raising or propelling liquid comprising a combustion and expansion chamber provided with an igniting device, an air chamber or other resilient cushion, automatic means adapted to introduce fuel and air separately and mix the same to form successive explosive charges in the explosion chamber, and means adapted to introduce air into the liquid to be raised.

39. An apparatus for raising water comprising a combustion and expansion chamber, means for admitting water to be raised, an air chamber communicating with and adapted to receive the pressure of the expansion chamber through the intervention of the water and means adapted to permit the direct backward flow of fluid from the air chamber to the expansion chamber and means adapted to introduce air into the water to be raised.

40. An apparatus for raising water comprising a combustion and expansion chamber, means for admitting water to be raised, an air chamber communicating with the expansion chamber by a valved passage, a permanently open passage connecting the air chamber and the expansion chamber and means adapted to introduce air into the water to be raised.

41. An apparatus for raising water comprising a combustion chamber, means for admitting water to be raised, an igniter and a check valve opening freely inward to the combustion chamber for the admission of air, and an air chamber connected with the chamber by a valved passage.

42. An apparatus for raising water comprising a combustion chamber having an igniter, a check valve opening freely inward for the admission of air into the combustion chamber, an air chamber connected with the chamber by a valved passage and an intake pipe for water connected with the chamber and provided with a suitable inlet foot valve.

43. An apparatus for raising water comprising a combustion chamber having an igniter, means adapted to introduce an explosive charge thereinto, means for admitting water to be raised and a suitable check valve opening freely inward to the combustion chamber for the admission of air, a discharge pipe communicating with the chamber by a valved passage.

44. An apparatus for raising water comprising a combustion chamber having an igniter, means adapted to introduce an explosive charge thereinto, means for admitting water to be raised and a suitable check valve opening freely inward to the combustion chamber for the admission of air, a discharge pipe communicating with the chamber by a suitable valved passage and means adapted to introduce air into the water to be raised.

45. An apparatus of the named type comprising a combustion chamber having an igniter, means adapted to introduce an explosive charge, a suitable check valve opening freely inward to the combustion chamber for the admission of air, an air chamber or other resilient cushion connected with the chamber by a valved passage and means adapted to compress the charge prior to ignition.

46. An apparatus of the named type comprising a combustion chamber having an igniter, means adapted to introduce an explosive charge, a suitable check valve opening freely inward to the combustion chamber for the admission of air, an air chamber or other resilient cushion connected with the chamber by a valved passage and means adapted to permit and direct the compression of the charge prior to ignition by the resilience of the cushion.

47. An apparatus for raising or propelling liquid comprising a combustion and expansion chamber provided with an igniter, automatic means adapted to form an explosive charge within the combustion chamber, an air chamber or other resilient cushion freely communicating with the combustion chamber, a pipe connected with the air chamber, and means adapted to admit liquid thereinto, the air chamber and pipe being suitably arranged whereby the liquid is supported by the air in the air chamber, and means adapted to introduce air into the liquid in the pipe through the expansions of the explosive charge.

48. An apparatus of the named type comprising a combustion and expansion chamber having an igniter, means adapted to introduce an explosive charge, a suitable check valve opening freely inward for the admission of air and a surrounding air chamber connected and communicating with the expansion chamber.

49. An apparatus of the named type comprising a combustion and expansion chamber having an igniter, means adapted to introduce an explosive charge, a suitable check valve opening freely inward for the admission of air, and a surrounding air chamber connected and communicating with the combustion and expansion chamber by a suitable valved passage.

50. An apparatus of the named type comprising a combustion and expansion chamber having an igniter, means adapted to introduce an explosive charge, a suitable check valve opening freely inward for the admission of air, fluid acting as a piston introduced between the explosive charge and the resistance to be overcome, and a surrounding air chamber connected and communicating with the combustion and expansion chamber.

51. An apparatus of the named type comprising a combustion and expansion chamber having an igniter, means adapted to introduce an explosive charge, a suitable check valve opening freely inward for the admission of air, fluid acting as a piston introduced between the explosive charge and the resistance to be overcome, and a surrounding air chamber connected and communicating with the expansion chamber by a suitable valve controlled passage.

52. An apparatus of the named type comprising a combustion and expansion chamber having an igniter, means adapted to introduce an explosive charge, a suitable check valve opening freely inward for the admission of air, and a surrounding air chamber connected and communicating with the expansion and combustion chamber by a suitable valved passage and a by-pass or passage between the air chamber and the expansion chamber.

53. An apparatus for raising water comprising a combustion and expansion chamber having a suitable igniter, means for admitting water, and a fuel pump connected with the combustion chamber adapted to be operated directly by the pressure in said chamber.

54. An apparatus for raising water comprising a combustion and expansion chamber having a suitable igniter, means for admitting water, means for introducing fuel oil consisting of a pump connected with the combustion chamber adapted to be operated one way by the pressure in said chamber and in the opposite direction by a spring.

55. An apparatus for raising water comprising a combustion and expansion chamber, means for admitting water, means adapted to introduce an explosive charge, and an igniter to fire the charge having one electrode or wiper suitably arranged whereby its movement to make a spark is effected by the direct pressure in the combustion chamber.

56. An apparatus for raising water comprising a combustion and expansion chamber, means for admitting water, means adapted to introduce an explosive charge, and an igniter to fire the charge having one electrode provided with a piston in a cylinder open at one end to the expansion chamber whereby the piston and electrode or wiper are moved by the direct pressure in the cylinder.

57. An apparatus for raising water comprising a combustion and expansion chamber, means for admitting water, means for introducing and igniting fuel consisting of a pump provided with a wiper adapted to engage wth a sparker electrode and suitably arranged whereby through the movement of the pump, the fuel is forced into the combustion chamber and the sparking and igniting is effected.

58. An apparatus for raising water comprising a combustion and expansion chamber, means for admitting water, means for introducing an igniting fuel consisting of a pump operated by the direct pressure in said chamber and being provided with a suitable electrode or wiper whereby through the movement of the pump, the fuel is forced into the combustion chamber and sparking contact and ignition thereof is effected.

59. A device for raising or propelling fluid comprising a chamber, automatic means adapted to introduce a gaseous charge, means adapted to effect the compression and subsequent expansion of said charge, a discharge pipe for said device consisting of a well casing, and means adapted to convey the expanded gases beneath a column of liquid in the discharge pipe.

60. A device for raising water comprising a chamber adapted to contain a gaseous charge, means adapted to expand said charge, a discharge pipe for said device consisting of a well casing and means adapted to convey the expanded gases and a volume of atmospheric air beneath a column of water in the discharge pipe.

61. In an apparatus for raising or propelling liquid, the combination with a pipe one end of which is adapted to be submerged, of means for effecting a current of elastic fluid in said pipe to effect the displacement of liquid under the normal surface of the liquid in which the end of the pipe is submerged whereby a column of intermingled elastic fluid and liquid is formed, and explosion producing means for effecting a resilient pressure beneath the intermingled column to move it.

62. In an apparatus for raising or propelling liquid, the combination with a pipe one end of which is adapted to be submerged, of means adapted to effect explosive pressure therein for the displacement of liquid under the normal surface of the pipe is submerged, which the end of the pipe is submerged, means for inducing the entrance of air by atmospheric pressure into the space from which liquid has been displaced.

63. A device for raising or propelling liquid comprising a chamber, automatic means adapted to introduce a gaseous charge, means adapted to effect the compression and subsequent expansion of said charge, a discharge pipe for said device consisting of a well casing, and means adapted to convey and discharge the expanded gases beneath a column of discharge liquid, and means adapted to dilute the discharge gases with air.

64. An apparatus for raising water comprising a combustion and expansion chamber having an igniter, means adapted to introduce an explosive charge, means for admitting water, means adapted to admit atmospheric air to the products of combustion, and means adapted to permit and direct the escape of the products of combustion and atmospheric air beneath the water to be raised, the chamber being suitably arranged in the path of the incoming water whereby the water separates the air in the chamber from that beneath the water.

65. An apparatus for raising water comprising a combustion chamber having an igniter, means adapted to introduce an explosive charge thereinto, means for admitting water to be raised, a suitable check valve opening freely inward to the combustion chamber for the admission of air, an air chamber or other resilient cushion adapted to oppose the expansion of the charge and a discharge pipe and means adapted to introduce air into the water to be raised.

66. An apparatus for raising water comprising an explosion chamber, means for introducing and igniting an explosive charge, an inwardly opening check valve for the admission of atmospheric air to the explosion chamber, an expansion chamber and a pipe of less sectional area than the expansion chamber connecting these chambers, an air chamber surrounding and inclosing the explosion chamber and pipe, a discharge pipe and means adapted to admit water thereinto in free communication with the expansion chamber.

67. In an apparatus for applying energy derived from explosions, the combination of a combustion chamber, means for forming an explosive mixture therein, means for igniting the fuel, a chamber in free communication with the combustion chamber having means for admitting liquid thereinto, and means for scavenging spent gases from the combustion chamber.

68. In an apparatus for applying energy derived from explosions, the combination of a combustion chamber, means for admitting explosive fuel thereinto, means for igniting the fuel, a chamber in free communication with the combustion chamber having means for admitting liquid thereinto, means for admitting into and through the combustion chamber a scavenging fluid whereby the spent gases of combustion are swept ahead of the scavenging fluid.

69. In an apparatus for applying energy derived from explosions, the combination of a combustion chamber, means for admitting explosive fuel into said chamber, means for igniting the fuel, a chamber in free communication with the combustion chamber, and means for admitting liquid thereinto, means for admitting into and through the combustion chamber air whereby the spent gases of combustion are swept ahead of the air and the chamber thereby scavenged of spent gases.

70. In an apparatus for raising or propelling liquid, the combination of a pipe, one end of which is adapted to be submerged, means for introducing an elastic fluid through said pipe beneath the normal surface of the liquid in which the end of the pipe is submerged and expanding said fluid by heat whereby liquid is displaced, means for introducing into the space from which liquid has been displaced air or other gas to occupy the space formed by the contraction of the heated resilient fluid on cooling, whereby a column of intermingled liquid and gas is formed.

71. In an apparatus for raising or propelling liquid, the combination of a pipe, one end of which is adapted to be submerged, means for introducing an elastic fluid through said pipe beneath the normal surface of the liquid in which the end of the pipe is submerged, and for expanding said fluid by heat, whereby liquid is displaced, a second pipe communicating with the first one to receive and discharge the displaced liquid, means for introducing into the space from which liquid has been displaced air or other gases to occupy the space formed by the contraction of the heated resilient fluid on cooling, whereby a column of intermingled liquid and gas is formed in the discharge pipe.

72. In an apparatus for raising or propelling liquid, the combination of a pipe, one end of which is adapted to be submerged, means for introducing an elastic fluid through said pipe beneath the normal surface of the liquid in which the end of the pipe is submerged, and for expanding said fluid by heat, whereby liquid is displaced, means for introducing into the space from which liquid has been displaced air or other gas to occupy the space formed by the contraction of the heated resilient fluid on cooling, whereby a column of intermingled liquid and gas is formed, and means for applying pressure beneath the intermingled column to raise it.

73. In an apparatus for raising or propelling liquid, the combination of a pipe, one end of which is adapted to be submerged, means for introducing an elastic fluid through said pipe beneath the normal surface of the liquid in which the end of the pipe is submerged, and for expanding said fluid by heat whereby liquid is displaced, a second pipe communicating with the first one to receive and discharge the displaced liquid, means for introducing into the space from which the liquid has been displaced air or other gas to occupy the space formed by the contraction of the heated resilient fluid on cooling, whereby a column of intermingled liquid and gas is formed in the discharge pipe, and means for applying pressure beneath the intermingled column to raise it.

74. In an apparatus for applying energy derived from explosions, the combination of an explosion chamber, means for admitting an explosive charge thereinto, means for igniting said charge, means for admitting a body of liquid into a confined space in free communication with said chamber so that it shall be in contact with the products of combustion of said charge when explosion occurs, means for permitting the escape of said liquid from said space under the expansive force of the explosion and against the resistance to be overcome and permitting the return of a portion of it thereto, and means for commingling air or other gas with said body of liquid upon the discharge side of said chamber whereby it is rendered elastic.

75. In an apparatus for applying energy derived from explosions, the combination of an explosion chamber, means for admitting an explosive charge thereinto, means for igniting said charge, means for admitting a body of material that is capable of flowing into a confined space in free communication with said chamber, means for permitting and directing the escape of said material in a discharge column under the expansive force of the explosion, and the return of a portion of it to said space, and a resilient cushion in communication with said column and means for introducing into said column an elastic material of less specific gravity.

76. In an apparatus for raising or moving fluid, the combination of a combustion chamber, means for admitting explosive fuel thereinto, means for igniting the fuel, a chamber in free communication with the combustion chamber having means for admitting liquid thereinto, the said parts having such relative arrangement, that upon each explosion gas is carried with the liquid beyond the expansion space, and means for scavenging spent gases from the combustion chamber.

77. In apparatus for moving liquid, the combination of means for bringing a combustible charge against a body of liquid, means for compressing and then expanding the charge, thereby moving the liquid to force liquid to a greater head or pressure, and means whereby the pressure of returning liquid is utilized to introduce fresh combustible charges.

78. In apparatus for moving liquid, the combination of means for bringing a combustible charge against a body of liquid, means for compressing and then expanding the charge, thereby moving the liquid to force liquid to a greater head or pressure, and means whereby the pressure of returning liquid is utilized to introduce and compress fresh combustible charges.

79. In apparatus for moving liquid, the combination of means for bringing a combustible charge against a body of liquid, means for compressing and then expanding the charge, thereby moving the liquid to force liquid to a greater head or pressure, and means whereby the pressure of returning liquid is utilized to introduce, compress and ignite fresh combustible charges.

80. In apparatus for moving liquid, the combination of means for bringing a combustible charge against a body of liquid, means for compressing and then expanding the charge, thereby moving the liquid to force liquid to a greater head or pressure, means providing a resilient cushion adapted to be compressed by the liquid, and means whereby the pressure of returning liquid is utilized to introduce fresh combustible charges.

81. In apparatus for moving liquid, the combination of means for bringing a combustible charge against a body of liquid, means for compressing and then expanding the charge, thereby moving the liquid to force liquid to a greater head or pressure and means whereby the pressure of returning liquid is utilized to introduce and compress a fresh combustible charge.

82. In apparatus for moving liquid, the combination of means for bringing a combustible charge against a body of liquid, means for compressing and then expanding the charge, thereby moving the liquid to force liquid to a greater head or pressure and means whereby the pressure of returning liquid is utilized to introduce, compress and ignite a fresh combustible charge.

83. In apparatus for moving liquid, the combination of means for bringing a combustible charge against a body of liquid, means for compressing and then expanding the charge to move the liquid to force liquid to a greater head or pressure and means whereby the pressure of returning liquid is utilized to introduce a fresh combustible charge, and means whereby air is entrapped with the liquid upon each expansion of a combustible charge to reduce the specific gravity of the liquid column.

84. In apparatus for moving liquid, the combination of means for bringing a combustible charge against a body of liquid, means for compressing and then expanding the charge thereby moving the liquid to force liquid to a greater head or pressure and means whereby the pressure of returning liquid is utilized to introduce a fresh combustible charge and means whereby air is entrapped with the liquid upon each expansion of a combustible charge to reduce the specific gravity of the liquid column and to render the same resilient.

85. In apparatus for moving liquid, the combination of means for bringing a combustible charge against a body of liquid, means for compressing and then expanding the charge thereby moving the liquid to force liquid to a greater head or pressure and means whereby a partial backflow of liquid is permitted after the force of each expansion is expended, to introduce a combustible element.

86. In apparatus for moving liquid, the combination of means for bringing a combustible charge against a body of liquid, means for compressing then expanding the charge, thereby moving the liquid to force liquid to a greater head or pressure and means for permitting a partial backflow of liquid after the force of each expansion is expended to introduce a combustible element and to compress and ignite the charge.

87. In apparatus for moving liquid, the combination of means for bringing a combustible charge against a body of liquid, means for compressing and then expanding the charge thereby moving the liquid to force liquid to a greater head or pressure, and utilizing the pressure of returning liquid to introduce a combustible charge and utilizing each impulse to force liquid to greater head or pressure to introduce fresh liquid and to entrap air and carry the same along with the liquid.

WILLIAM H. SMYTH.

Witnesses:
A. B. BOWERS,
J. H. MILLER.